United States Patent
Deckenbach et al.

(10) Patent No.: US 6,845,119 B2
(45) Date of Patent: Jan. 18, 2005

(54) LASER ILLUMINATING APPARATUS FOR ILLUMINATING A STRIP-SHAPED OR LINEAR AREA

(75) Inventors: Wolfgang Deckenbach, Schechen (DE); Thomas Attenberger, Poing (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/198,987

(22) Filed: Jul. 22, 2002

(65) Prior Publication Data

US 2003/0026000 A1 Feb. 6, 2003

(30) Foreign Application Priority Data

Jul. 23, 2001 (DE) .......................................... 101 35 828

(51) Int. Cl.[7] .................................................. H01S 3/08
(52) U.S. Cl. ........................................ 372/101; 359/642
(58) Field of Search .......................... 372/101, 98, 92; 359/642

(56) References Cited

U.S. PATENT DOCUMENTS

| | | | | |
|---|---|---|---|---|
| 4,293,776 A | | 10/1981 | Sick et al. .................. 250/572 |
| 4,731,772 A | * | 3/1988 | Lee .............................. 369/45 |
| 4,861,983 A | * | 8/1989 | Sasada et al. ............... 250/235 |
| 4,942,583 A | * | 7/1990 | Nazarathy et al. ............ 372/20 |
| 5,140,608 A | | 8/1992 | Karpol et al. ................ 372/101 |
| 5,561,743 A | * | 10/1996 | Kanai et al. ................. 358/1.7 |
| 2003/0030012 A1 | | 2/2003 | Ahlers et al. ............ 250/458.1 |

FOREIGN PATENT DOCUMENTS

| | | | | |
|---|---|---|---|---|
| DE | 100 31 388 A1 | * | 1/2002 | ............ G07D/7/00 |
| EP | 762174 | | 3/1997 | |
| JP | 03274550 | | 4/1993 | |
| JP | 10-63913 | | 3/1998 | |
| JP | 10-105093 | | 4/1998 | |
| JP | 11039831 | | 9/2000 | |
| JP | 2000237888 | * | 9/2000 | ............ B23K/26/08 |

* cited by examiner

Primary Examiner—Don Wong
Assistant Examiner—Leith A Al-Nazer
(74) Attorney, Agent, or Firm—Bacon & Thomas, PLLC

(57) ABSTRACT

A laser illuminating apparatus that illuminates a linear or strip-shaped area (S) of sheet material (B) with high radiant power contains a diode laser (2) whose output is followed by two mutually orthogonally oriented rod lenses (4, 6) whose focal length is small in comparison to their distance. Between the two rod lenses (4, 6) a laser light beam fan (L2) is formed. Said fan is focused by the second rod lens (6) on a narrow linear area (S). Behind said area the laser beams diverge at a large angle ($\alpha$) so that the power density decreases accordingly rapidly. If the light falls on the retina of an observer's eye, the laser light is not focused pointwise but only linearly, which excludes injury to the eye due to the accordingly low power density.

3 Claims, 1 Drawing Sheet

LASER ILLUMINATING APPARATUS FOR ILLUMINATING A STRIP-SHAPED OR LINEAR AREA

BACKGROUND OF THE INVENTION

This invention relates to a laser illuminating apparatus for illuminating a strip-shaped or linear area of an object, in particular sheet material.

Such illuminating apparatuses are used for example in test apparatuses for spectroscopic examination of sheetlike material, for example bank notes, ID cards and the like. Light diffusely reflected or transmitted by the illuminated strip-shaped or linear area of the object is detected by a sensor and evaluated, to detect for example the presence of errors or certain properties.

EP 0 762 174 (corresponding to DE 195 32 877) discloses an illuminating apparatus for illuminating a strip-shaped or linear area of sheet material that consists of segments of a cylindrical mirror with an elliptical base. On one of two focal lines there is a light-emitting diode array (LED array), the other focal line corresponds to the illuminated area of the sheet material. Specifically for spectroscopic examination, however, the light emitted by light-emitting diodes is unfavorable since the light is broadband. Furthermore the irradiance is low, while high irradiance in the area to be illuminated is desirable.

An older German patent application from the applicant (100 19 428.1) describes a laser illuminating apparatus for illuminating a strip-shaped or linear area of sheet material which attains improved luminance in comparison to an illuminating apparatus equipped with light-emitting diodes. Since laser applications must heed regulations for personal eye protection, the older proposal provides a fiber optic between the laser light source and the area to be illuminated for changing the laser beam cross section so that if the laser beam bundle falls on a human eye a relatively large spot with sufficiently low power density arises on the retina of the eye. However, the fiber optics involves a complex structure and furthermore leads to considerable loss of light.

DE 43 35 244 A1 discloses a so-called laser spotlight with two optical plates each in the form of a cylindrical Fresnel lens with a microlens structure. Such an assembly is not suitable for illuminating linear or strip-shaped areas, however. The large-large-surface cylindrical Fresnel lenses involve considerable losses of light in the range of 30–70% of the laser power. A similar assembly—albeit with a plurality of laser sources—is known from DE 197 09 302 A1.

To increase the detection sensitivity of a test apparatus for sheet material, high radiant power at the illuminated place is desired. High radiant powers can be obtained by illuminating apparatuses with laser light sources, for example laser diodes of laser classes 3B and 4, Nd:YAG lasers, solid-state lasers in general, in pulsed or cw mode. Wavelengths to be used range from the UV region through the visible region to the infrared region, that is, wavelengths from under 400 to about 1400 nanometers.

To guarantee personal eye protection, however, restrictive power limitations must be heeded, that is, only relatively low laser powers may be used or special saftey measures must be taken that make the overall system complicated and elaborate.

SUMMARY OF THE INVENTION

The invention is based on the problem of stating a laser illuminating apparatus for illuminating a strip-shaped or linear area of an object that permits strong illumination of the area to be illuminated with laser light, is characterized by low losses and furthermore guarantees the required personal eye protection.

First, the inventive laser illuminating apparatus spatially fans out the laser light generated by a laser light source in two mutually orthogonal directions to form a laser light beam fan. By an astigmatic lens having a small focal length in comparison to its distance from the origin of the laser light beam fan, said laser light beam fan is disposed with respect to the area to be illuminated so as to achieve linear or striped illumination in said area. The relatively small focal length of the astigmatic lens, which is formed in particular as a grid rod lens, causes the area to be illuminated to be disposed relatively near said astigmatic lens, and with increasing distance from the focal plane of the astigmatic lens the laser beam bundle diverges at a very large divergence angle. A large divergence angle means that any observer in this area will be confronted with relatively low power density of the laser beams.

The formation of the laser light beam fan is preferably likewise obtained with an astigmatic lens, so that for example two mutually orthogonal rod lenses are disposed at a relatively great distance—based on their focal lengths—in the output beam path of the laser. Such an assembly of two astigmatic lenses permits an extremely simple structure while simultaneously guaranteeing the required eye protection for any observers. Corresponding geometrical arrangement and selection of the lenses permits the total laser light to pass through the lenses, which avoids losses. Additional measures to permit total laser light to pass through the lens may be taken to obtain a further reduction of losses.

The laser light beam fan is characterized by first and second divergence angles that are substantially perpendicular to each other. The divergence angles can be adjusted with the aid of a collimation optic located at the output of the laser beam source. The divergence angle perpendicular to the longitudinal extension of the second lens, that is, the one adjacent the area to be illuminated, is adjusted so as to be smaller than the diameter of the astigmatic lens formed as a rod lens.

The laser light beam fan may be formed not by a rod lens but by an active beam diverter, for example in the form of a rotating polygonal mirror, a galvanometer mirror or the like. Such scanning apparatuses are favorable in particular for scanning coding patterns and the like.

The inventive measures make it possible to use a laser light source with high output power, thereby achieving—with the further help of measures for containing losses—high radiant power in the area to be illuminated. Since the laser light is extremely narrow-band it is especially suitable for carrying out spectroscopic examinations of for example bank notes and the like. Furthermore, personal eye protection is guaranteed despite the high laser power, since the laser light cannot be focused on a point of the retina but only on a line of the retina due to the astigmatic lens assembly (astigmatism=not converging to a point). This avoids pointwise high power densities on the retina. It is thus possible to increase the power to several hundred megawatts e.g. while heeding the standard DIN EN 60825 in laser class 3a permitting only few megawatts. Corresponding selection of the components and geometrical arrangement geometrical arrangement make it possible to obtain line or strip widths of under 0.5 millimeters.

BRIEF DESCRIPTION OF THE DRAWINGS

In the following, some examples of the invention will be explained in more detail with reference to the drawing, in which:

FIG. 3 shows a perspective view of an alternative laser light source that permits the beam diverging optic shown in FIGS. 1 and 2 to be dispensed with.

DETAILED DESCRIPTION OF THE PREFERRED EMBODIMENTS

Figure 1:
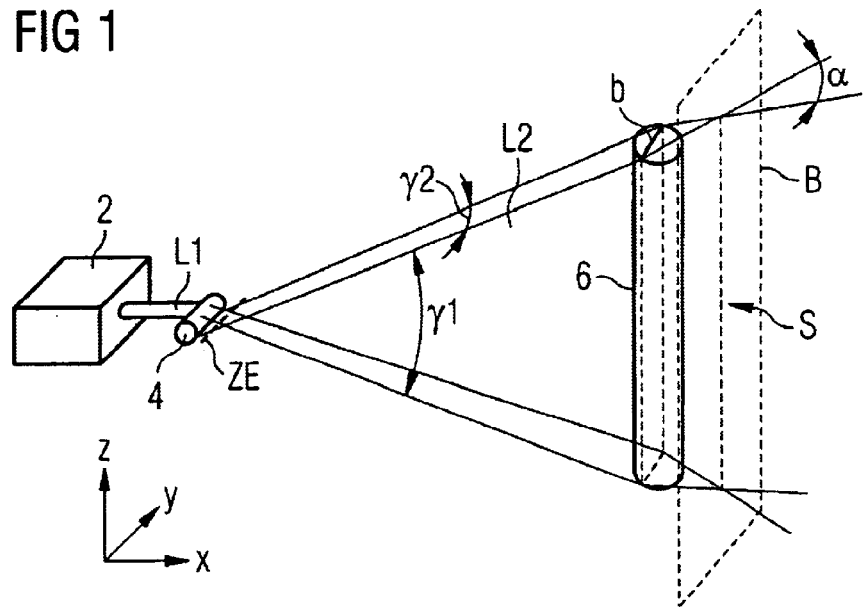
FIG. 1 shows a schematic, perspective view of a laser illuminating apparatus for illuminating a linear area on a bank note.

FIG. 1 shows a part of a test apparatus for spectroscopic examination of bank notes, this apparatus serving only as an example of numerous other apparatuses in which the inventive laser illuminating apparatus can be used.

Laser light source 2 formed here for example as a diode laser emits collimated laser beam L1 onto grid rod lens 4 oriented with its longitudinal axis in the Y direction of a Cartesian coordinate system. From collimated laser beam bundle 1 grid rod lens 4 produces laser light beam fan L2 that has its origin in intermediate image plane ZE and is characterized by two divergence angles, namely first divergence angle $\gamma 1$ in the Z direction and divergence angle $\gamma 2$ orthogonal thereto in the Y direction.

Laser light beam fan L2 hits rod lens 6 whose longitudinal axis is oriented orthogonally to the longitudinal axis of rod lens 4. As indicated above in FIG. 1, the dimensions of rod lens 6 are coordinated with the cross section of laser light beam fan L2 such that width b of laser light beam fan L2 in the area of rod lens 6 is smaller than the diameter of rod lens 6. In the longitudinal direction of rod lens 6 the total cross section of the laser light beam fan enters the lens.

Rod lens 6 fans in the beams of laser light beam fan L2 so that strip-shaped or linear illuminated area S arises on bank note B. The distance between bank note B and rod lens 6 can be selected so that the illuminated area is located directly in the focal plane of rod lens 6. In this case a minimal width of linear or strip-shaped area S is obtained. If bank note B is moved somewhat out of the focal plane, illuminated strip S widens.

Figure 2:
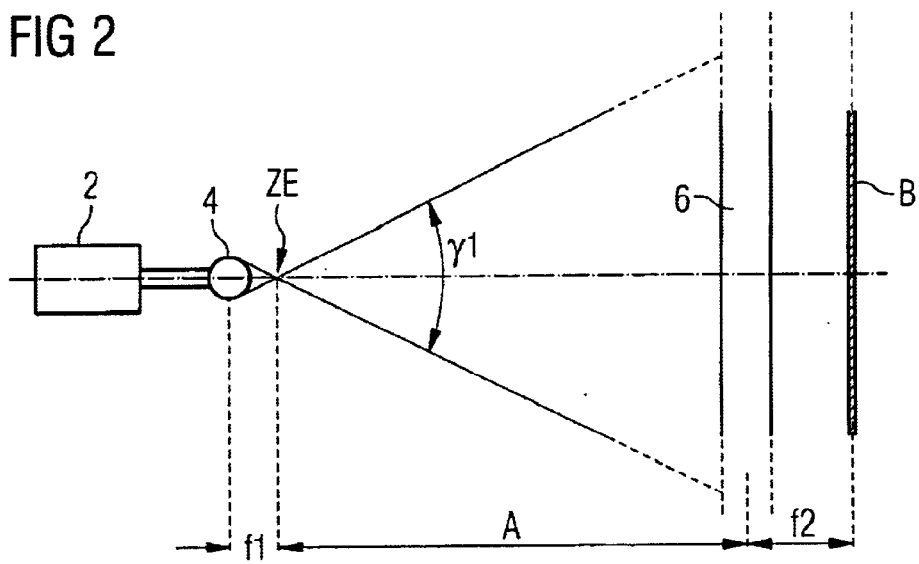
FIG. 2 shows a schematic side view of the assembly shown in FIG. 1.

FIG. 2 shows the geometrical relations of the assembly shown in FIG. 1 in a side view. The focal length of rod lens 4 is designated f1, that of rod lens 6 f2. The distance between the center axes of rod lenses 4 and 6 is designated A. Distance A corresponds to a multiple both of focal length f1 and of focal length f2.

Figure 3:
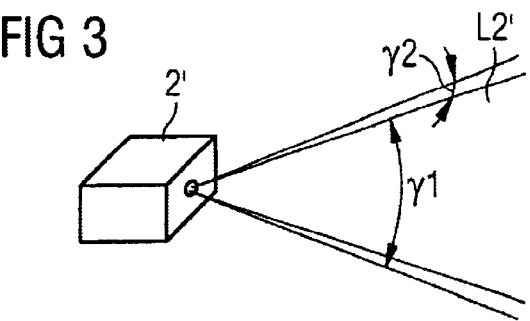

Certain lasers fundamentally have divergence properties corresponding to the relations of laser light beam fan L2 shown in FIG. 1. Such a laser, in particular a diode laser, is shown in FIG. 3 as an alternative embodiment. The diode laser acting as laser light source 2' emits laser light beam fan L2' having two convergence angles $\gamma 1$ and $\gamma 2$. In this case, first rod lens 4 shown in FIGS. 1 and 2 can be omitted.

As a further embodiment, a rotating polygonal mirror assembly or a galvanometer mirror assembly can be provided instead of rod lens 4 in order to fan out the collimated light beam at the output of the laser.

As a further alternative, a collimator optic at the output of the laser beam source before the rod lens 4 can be used in order to adjust the desired fanning out of the laser light.

As shown in FIGS. 1 and 2, focal length f2 of rod lens 6 is very small in relation to the distance between rod lenses 4 and 6. This means that strong ray widening at angle $\alpha$ takes place behind the focal plane in accordance with the position of bank note B, accompanied by a corresponding decrease in power density. If the fanned out laser light should fall into a person's eye behind bank note B, the light is focused on the retina of the eye only on a line, while point focusing is excluded. This meets the requirement of an upper limit for the local load on the retina.

Aforementioned divergence angle $\alpha$ (FIG. 1) obeys the relation $\alpha = 2*\arctan(b/2*f2)$, which indicates that short focal length f2 yields large divergence angle $\alpha$.

As described above for beam diverging optic 4, it is also possible in the case of astigmatic lens 6 to use optical systems other than lenses that have imaging properties corresponding to those of astigmatic lens 6. Mirrors are especially suitable.

What is claimed is:

1. A laser illuminating apparatus for illuminating a strip-shaped or linear area of an object, the apparatus comprising:

a laser light source arranged to emit a laser light beam fan fanned out spatially in two mutually orthogonal directions;

a first astigmatic rod lens that has a short focal length in comparison to a distance from the origin of the laser light beam fan to the first astigmatic rod lens, the first rod lens having a focal plane that lies on or near a location where an object may be disposed for illumination;

wherein the laser light source includes a beam diverging optic comprising a second astigmatic rod lens having a small focal length in comparison to a distance between the first and second rod lenses; and wherein a longitudinal axis of the first rod lens is oriented orthogonally to a longitudinal axis of the second rod lens.

2. The laser illuminating apparatus according to claim 1, wherein the optical surfaces of the first and second rod lenses are configured to permit at least substantially all of an entirety of laser light projected from the laser light source to pass therethrough.

3. The laser illuminating apparatus according to claim 1, wherein the first rod lens has a diameter, and a divergence angle of the laser light beam fan orthogonal to the course of the strip-shaped or linear area is selected so that for the distance between the first and second rod lenses is smaller than a diameter of the first rod lens.

* * * * *